July 2, 1957 W. C. RADE 2,797,653
CUTTER AND MOLD ASSEMBLY FOR MARSHMALLOWS AND THE LIKE
Filed Sept. 7, 1954
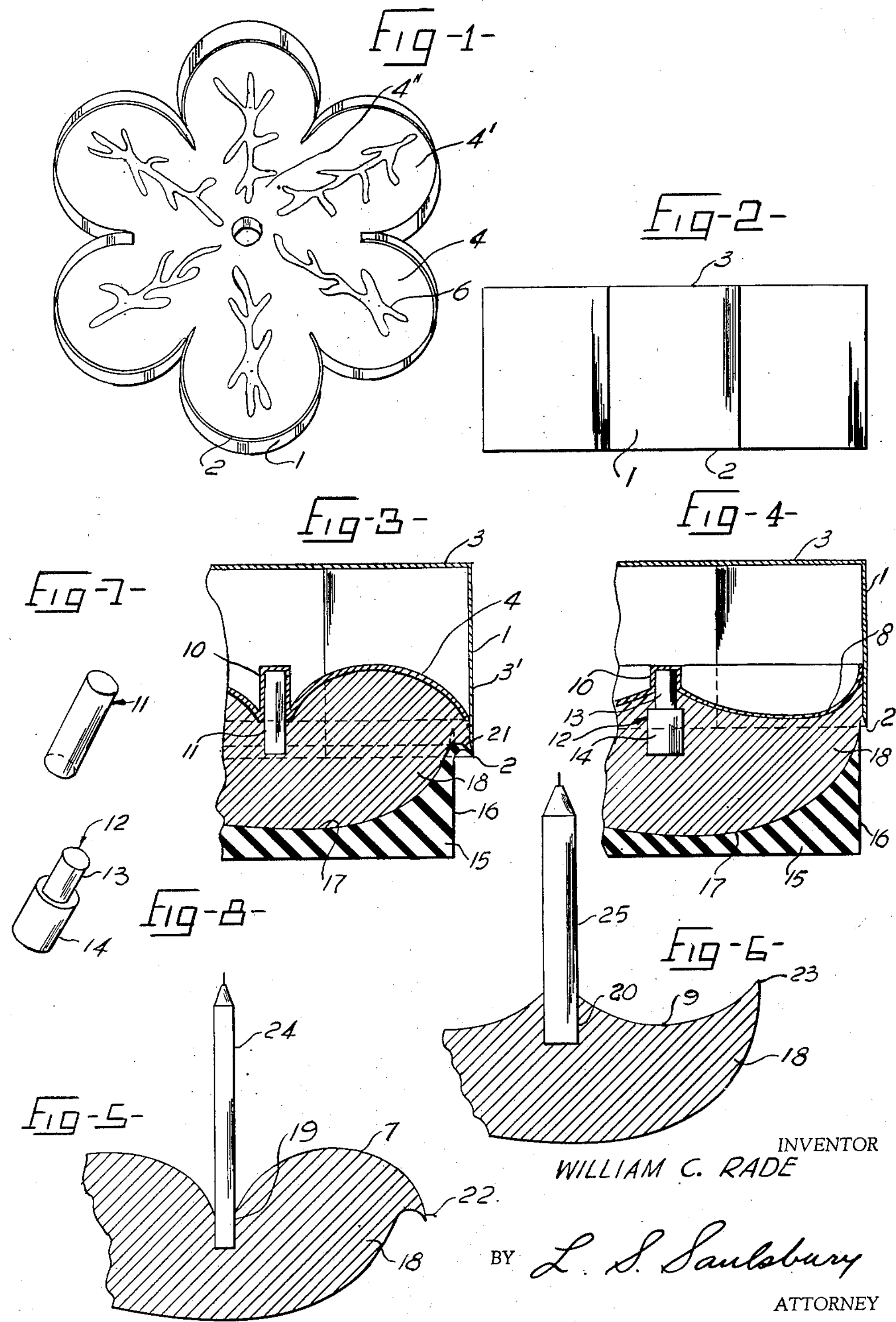
INVENTOR
WILLIAM C. RADE
BY L. S. Saulsbury
ATTORNEY United States Patent Office 2,797,653

Patented July 2, 1957

2,797,653

CUTTER AND MOLD ASSEMBLY FOR MARSHMALLOWS AND THE LIKE

William C. Rade, Long Beach, Calif.

Application September 7, 1954, Serial No. 454,477

1 Claim. (Cl. 107—19)

This invention relates to a cutter and mold assembly for the preparation of ornamental shapes from moldable materials, such as marshmallows and similar confections.

It is an object of the invention to provide a cutter having an embossed shaping surface of novel configuration so that ornamental shapes bearing decorations on the upper face of the confection may be produced.

It is another object of the invention to provide a mold having a cavity of novel configuration to shape the underface of the moldable confection while forming and cutting the upper face thereof.

It is still another object of the invention to provide removable auxiliary shaping devices which can be made part of the cutter to vary the configuration thereof and to cause if desired, a center hole to be formed in the marshmallow for the purpose of supporting a small candle.

Other objects of the invention are to provide a cutter and mold for confections and the like having the above objects in mind which is of simple construction, inexpensive to manufacture, has a minimum number of sanitary parts, easy to use and efficient in operation.

For other objects and a better understanding of the invention, reference may be had to the following detailed description taken in connection with the accompanying drawing, in which:

Figure 1 is a bottom perspective view looking upwardly into a cutter having an embossed molding face of novel configuration;

Fig. 2 is a side elevational view of the cutter shown in Fig. 1;

Fig. 3 is a fragmentary sectional view of a cutter with a removable center shaping device made a part of the cutter and of the mold, and with a marshmallow between the cutter and the mold in the process of being cut and shaped.

Fig. 4 is a fragmentary sectional view similar to Fig. 3 of a cutter having a differently shaped mold face and a large size removable center shaping device, and a mold, and with a marshmallow between the cutter and the mold in the process of being differently shaped;

Fig. 5 is a fragmentary sectional view of a marshmallow cut and shaped by the cutter and mold shown in Fig. 3 and being used as an ornamental holder for a small candle;

Fig. 6 is a fragmentary sectional view of a marshmallow cut and shaped by the cutter and mold shown in Fig. 4 and used as an ornamental holder for a larger candle;

Fig. 7 is a perspective view of one removable center shaping device that can be made part of the cutter to make the small size opening for the small size candle;

Fig. 8 is a perspective view of the other removable center shaping device that serves to make the large size opening for the large size candle.

As may be seen in Figs. 1 through 4, the cutter consists of a vertically-extending shell 1 of novel outline having a cutting edge 2 and a top closure 3. The particular cutter has bottom closure 4 with petal-shaping portions 4′ extending outwardly from a central portion 4″; while this cutter produces an article having a flower-like configuration, it will be apparent that cutter shells having other outlines may be used to produce other shapes, such as crosses, stars, leaves and so forth. The bottom closure 4 has a flange 3′ by which it is secured to the inner face of the cutter adjacent to the cutting edge 2.

The closure shaping face 4 has a decorative embossing 6 of any desired type. The closure 4, shown in Fig. 3, is curved downwardly toward the outer side and the center of the cutter to produce the top curvature 7 of the cut marshmallow shown in Fig. 5, while bottom closure 8, shown in Fig. 4, is curved upwardly toward the side and center of the cutter to produce an indented top curvature 9 of the cut article shown in Fig. 6.

Closures 4 and 8 are provided with central cylindrical recesses 10 adapted to receive and frictionally hold auxiliary removable center shaping devices 11 and 12, shown in Figs. 7 and 8.

The removable auxiliary shaping device 11 is a cylindrical punch adapted to fit snugly within the recess 10 and to extend outwardly therefrom. The removable auxiliary shaping device 12 has a cylindrical portion 13 adapted to fit snugly within the recess 10 and an enlarged cylindrical portion 14 of greater diameter adapted to extend outwardly from the recess to provide a larger opening for a larger size candle.

A mold 15 of hard yieldable material has a vertical side wall 16 and the same outline as the cutter shell 1, but there is sufficient difference in transverse size between the two so that when the cutter is brought downwardly toward the mold, the cutting edge 2 will pass outwardly of deflectable side walls 16, as shown in Figs. 3 and 4. Above its solid base portion the mold 15 has a cavity 17 of novel configuration adapted to receive and shape the bottom of the marshmallow.

When the cutter is pressed downwardly upon a marshmallow 18 placed in the mold 15, the cutting edges 2 will trim away surplus marshmallow to produce an article having the same outline as the cutter. At the same time, the marshmallow will be forced or squeezed downwardly into the mold 15 and its bottom face will assume the shape of the mold cavity 17, as viewed in Figs. 5 and 6.

When the cutter is pressed down so that the embossed closure 4 bears upon the upper face of the marshmallow, this upper face will assume the shape of the bottom closure, and the embossing 6 will impress a corresponding design into the upper face of the marshmallow, and the punches 11 and 12 will produce respective corresponding cavities 19 and 20, in the center of the shaped article. If a punch is not inserted into recess 10, the shaped article will have a raised portion in its top center, corresponding in shape to the recess 10.

The mold 15 may be made of wood, metal or plastic, but is preferably made of hard rubber or a similar yieldable material. When the cutter is pressed down upon a marshmallow in a hard rubber mold, top lip 21 of the mold will be slightly deformed and will produce an added novel effect in the shaped article. The marshmallow will be rolled outwardly over the lip 21 and cut by the cutting edge 2 of the cutter 1. The lip rides along the inner face of the cutting edge 2 and the internal shaping surface.

If the cutter bottom is curved downwardly toward the side, and the center of the cutter shell 1, as shown in Fig. 3, and the cutter is forced down firmly on the marshmallow in the mold, the top lip 21 is forced outwardly slightly to produce the downwardly-extending terminal portion 22 in the shaped article, as shown in Fig. 5.

If the cutter has an internal shaping surface curved upwardly toward the side and center of the cutter shell, as shown in Fig. 4, the top lip 21 will be forced upwardly within the cutter shell to produce the upwardly extending terminal portions 23 in the shaped article, as shown in Fig. 6.

The shaped articles, shown in Figs. 5 and 6, are used as decorative candle holders. The small cavity 19 in the article, shown in Fig. 5, holds a small candle 24, while the larger cavity 20 in the article, as shown in Fig. 6, has a holder for a larger candle 25.

If it is desired to have a decorative confection having a flat bottom face, the cutting is effected without the mold. In such case, the cutter will be pressed down upon a marshmallow resting upon a flat surface.

While various changes may be made in the detail construction, it shall be understood that such changes shall be within the spirit and scope of the present invention as defined by the appended claims.

What is claimed is:

A cutter and mold assembly for the production of confections of novel shape comprising a cutter having a vertically-extending shell provided with a rigid cutting edge and an upper internal shaping surface and a solid mold which is slightly smaller than the cutter and adapted to be received within the cutter, said mold having a cavity on one side with side walls of progressively thinner cross section terminating in a yieldable and sharp-edged lip on the peripheral edge thereof which is smaller than the cutting edge of the shell to provide a space between the lip and the cutting edge, and said cutting edge of the shell and said mold cavity being adapted to shape the top and bottom faces of a confection held in the mold under pressure exerted upon the cutter with the yieldable lip shaping the edge of the confection by means of the rigid cutting edge cooperating with the yieldable lip and the upper internal shaping surface whereby the lip is bent outwardly into the space between the lip and the cutting edge by the pressure of the confection in the mold.

References Cited in the file of this patent

UNITED STATES PATENTS

| | | |
|---|---|---|
| 459,700 | Euchenhofer | Sept. 15, 1891 |
| 762,649 | McCullough | June 14, 1904 |
| 1,474,640 | Pinkosh | Nov. 20, 1923 |
| 1,728,064 | Johnson | Sept. 10, 1929 |
| 1,977,309 | Jackson | Oct. 16, 1934 |
| 2,008,725 | Parker | July 23, 1935 |
| 2,214,475 | Napolillo | Sept. 10, 1940 |
| 2,228,335 | Allen | Jan. 14, 1941 |
| 2,731,926 | Eckhoff | Jan. 24, 1956 |